(12) United States Patent
Hendriks et al.

(10) Patent No.: US 7,352,514 B2
(45) Date of Patent: Apr. 1, 2008

(54) VARIABLE FOCUS LENS

(75) Inventors: Bernardus Hendrikus Wilhelmus Hendriks, Eindhoven (NL); Stein Kuiper, Eindhoven (NL); Christina Adriana Renders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 68 days.

(21) Appl. No.: 10/596,914

(22) PCT Filed: Jan. 13, 2005

(86) PCT No.: PCT/IB2005/050142

§ 371 (c)(1),
(2), (4) Date: Jun. 29, 2006

(87) PCT Pub. No.: WO2005/069044

PCT Pub. Date: Jul. 28, 2005

(65) Prior Publication Data

US 2007/0146490 A1    Jun. 28, 2007

(30) Foreign Application Priority Data

Jan. 14, 2004    (EP) .................... 04100100

(51) Int. Cl.
*G02B 1/06*    (2006.01)
*G02B 3/14*    (2006.01)

(52) U.S. Cl. .................................... 359/665
(58) Field of Classification Search ............... 359/665, 359/666, 667; 351/159–176
See application file for complete search history.

(56) References Cited

U.S. PATENT DOCUMENTS 7,265,911 B2    9/2007    Goosey et al. ............. 359/676

*Primary Examiner*—Scott J. Sugarman
*Assistant Examiner*—Darryl J. Collins
(74) *Attorney, Agent, or Firm*—Michael E. Belk

(57) ABSTRACT

An achromatic electrowetting lens is provided. This is achieved by a particular choice of the parameters n, n2, V, and V2, wherein n is the refractive index and V is the Abbe number. By fulfilling the relations: Formula (I) an achromatization of the electrowetting lens is achieved.

7 Claims, 3 Drawing Sheets

VARIABLE FOCUS LENS

The present invention relates to a variable focus lens comprising a first fluid and a second fluid, the fluids being non-miscible and in contact over a meniscus. The shape of the meniscus and thereby the focus of the lens can be controlled by applying a voltage.

Lenses of this type are referred to as electrowetting lenses. These electrowetting lenses are capable of varying their focus due to small amounts of electric power since no mechanical movable parts are required. An example of an optical apparatus comprising such an electrowetting lens is given in US 2002/0176148 A1.

Due to the low power consumption and the quick response to a varying voltage, the electrowetting lenses are particularly suitable for mobile applications in which a frequent focus variation is desired.

Unfortunately, many of the achievements with classical optical systems that are built up with solid lenses are not available with electrowetting lenses. For example, a conventional lens system is rendered achromatic by forming a cemented doublet or by combining an ordinary refractive lens with a diffractive lens. For the cemented doublet, normally the two elements forming the lens have substantially the same refractive index and different Abbe numbers. In order to provide achromatization, the optical powers $K_1$ and $K_2$ and the Abbe numbers $V_1$ and $V_2$ of the two elements are chosen such that they comply with the following equation:

$$\frac{K_1}{V_1} + \frac{K_2}{V_2} = 0 \tag{1}$$

wherein $K=K_1+K_2$ is the total optical power of the doublet. An example for an achromat fulfilling the above condition is for a given optical power $K_0$: $K_1=K_0$; $K_2=2K_0$; $V_1=30$, $V_2=60$.

Another method to achromatise a refractive lens is by adding a diffractive structure. The achromatization is similar as for the cemented doublet with the difference that the Abbe number of the diffractive structure is negative and equal to −3.452.

Both of the above mentioned methods for providing an achromat do not hold for electrowetting lenses because electrowetting lenses change the optical power while the above methods only work for lenses with fixed optical power. Furthermore, an electrowetting lens can change its optical power from positive to negative depending on the radius of the meniscus interface between two fluids.

An object of the present invention is to provide a variable focus lens having achromatic properties.

The above objects are solved by the features of the independent claims. Further developments and preferred embodiments of the invention are outlined in the dependent claims.

In accordance with the present invention, there is provided a variable focus lens comprising:
 a fluid chamber containing a first fluid (A) and a second fluid (B), the fluids being non-miscible and in contact over a meniscus,
 means for applying an electric field over the fluid chamber such that the shape of the meniscus varies in dependence on the electric field,
 the first fluid having an index of refraction $n_1$ and an Abbe number $V_1$, and the second fluid having an index of refraction $n_2$ and an Abbe number $V_2$, $n_1$ being different from $n_2$, wherein the parameters $n_1$, $n_2$, $V_1$ and $V_2$ comply with the following relation:

$$0.75 < \frac{V_1(n_2-1)}{V_2(n_1-1)} < 1.25 \tag{I}$$

The parameter ranges defined by the above relations can be derived by a combination of a theoretical and experimental analysis. The optical power of a lens made of a first fluid having a refractive index $n_1$ and of a second fluid having a refractive index $n_2$ is $$K = \frac{n_2-n_1}{R} \tag{2}$$

wherein R is the radius of the meniscus between the two fluids. Let the operating wavelength of the lens be 587 nm for the moment. Consider now a small change in the refractive $\delta n$ index arising due to the fact that the lens is operated at a different wavelength. Let $\delta n = n(486\ nm) - n(656\ nm)$, hence de difference in refractive index measured at the 486 nm and 656 nm wavelength. The change in optical power of the electrowetting lens is then given by $$\delta K = \frac{\delta n_2 - \delta n_1}{R} \tag{3}$$

and consequently when using equation (2) we find $$\delta K = \frac{\delta n_2 - \delta n_1}{n_2 - n_1} K \tag{4}$$

Considering the definition of the Abbe number V which is defined by $$V = \frac{n(587\ nm)-1}{n(486\ nm)-n(656\ nm)} = \frac{n(587\ nm)-1}{\delta n} \tag{5}$$

together with equation (4) leads to $$\delta K = \left[\frac{n_2-1}{V_2} - \frac{n_1-1}{V_1}\right]\frac{K}{n_2-n_1}. \tag{6}$$

In order that $\delta K$ vanishes, hence no optical power change due to a change in wavelength, we find that the equation $$\frac{V_1}{V_2} = \frac{n_1-1}{n_2-1} \tag{7}$$

must be fulfilled.

Starting from this theoretical result and considering measurements as to the performance of electrowetting lenses with respect to the achromatic properties leads to the condition:

$$0.75 < \frac{V_1(n_2 - 1)}{V_2(n_1 - 1)} < 1.25 \quad (I)$$

It should be understood that the values 0.75 and 1.25 in these relations are no fixed limits for the production of an achromatic variable focus lens. Allowing a wider range than from 0.75 to 1.25 might be appropriate in cases, where the lens performance with respect to its achromatization is not particularly important. The better the above equation (7) is fulfilled, the better is the performance of the lens with respect to its achromatization.

In this sense, a good performance of the lens can be provided, when the parameters $n_1$, $n_2$, $V_1$ and $V_2$ comply with the following relation:

$$0.9 < \frac{V_1(n_2 - 1)}{V_2(n_1 - 1)} < 1.1 \quad (II)$$

A preferable embodiment of the variable focus lens according to the present invention is provided with a variable focus lens, wherein
 the fluid chamber comprises a substantially cylindrical wall,
 a fluid contact layer is arranged on the inside of the cylindrical wall,
 the means for applying an electrical field comprising a first electrode separated from the first fluid and the second fluid by the fluid contact layer, and a second electrode acting on the first fluid, and
 the fluid contact layer having a wettability by the first fluid which varies under the application of a voltage between the first electrode and the second electrode, such that the shape of the meniscus varies in dependence on the voltage.

Thus, the present invention can be employed with an electrowetting lens of the kind that presently gains acceptance on the market.

A preferable example of a variable focus lens according to the present invention is provided by a lens, wherein the first fluid has an index of refraction of $n_1=1.37$ and an Abbe number of $V_1=49$, and the second fluid has an index of refraction of $n_2=1.4$ and an Abbe number of $V_2=53$. These values that can be readily provided under realistic conditions fulfill the above mentioned relations for achromatization.

The variable focus lens according to the present invention can be considered as a lens, wherein the first fluid comprises salted water, and the second fluid comprises polydimethylsiloxane. These and other fluids can be used and provided with Abbe numbers and refractive indices and fulfill the above relations for achromatization.

Thus, the variable focus lens can be advantageously implemented in an optical device, particularly an optical device with mobile application that acts on a whole wavelength range.

In that sense, the present invention is particularly advantageous with relation to an image capture device. For example, mobile telephones that are provided with an image capturing feature can be provided with a variable focus lens according to the present invention in order to maintain the small size of these devices. However, also different image capturing devices, such as normal cameras or video cameras can be provided with an optical device according to the present invention, since also in case of these devices it is desirable to avoid mechanical moving parts, to reduce the devices in size and to provide the possibility of a quick focus change.

Other application areas then imaging capturing devices are in optical recording, ophthalmic lenses, endoscopy lenses, telescopes, microscopy and lithography. These and other aspects of the invention will be apparent from and elucidated with reference to the embodiments described hereinafter.

Figure 1:
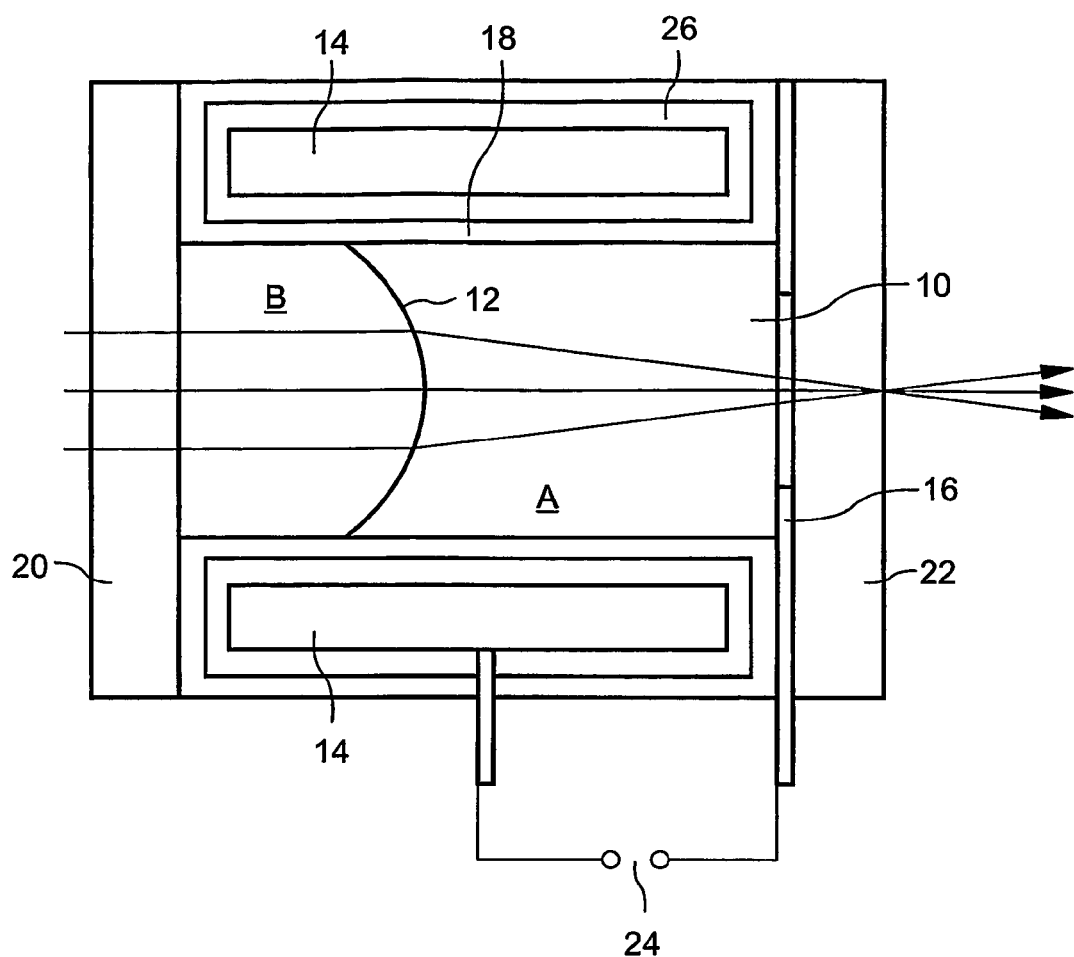
FIG. 1 shows a variable focus lens in accordance with an embodiment of the present invention in schematic cross section.

FIG. 1 shows a variable focus lens in accordance with an embodiment of the present invention in schematic cross section. The lens comprises a cylindrical first electrode 14 forming a capillary tube, sealed by a transparent front element 20 and a transparent back element 22 to form a fluid chamber 10 containing two fluids A and B. The electrode 14 may be a conducting coating applied on the inner wall of a tube.

The two fluids A, B consist of two non-miscible liquids in the form of an electrically conducting first fluid A, such as water containing a salt solution, and an electrically insulating second fluid B, such as a silicone oil or an alkane referred to herein further as "the oil". The two liquids are preferably arranged to have an equal density, so that the lens functions independently of orientation, i.e. without dependence on gravitational effects between the two liquids. This may be achieved by appropriate selection of the first liquid constituent; for example alkanes or silicone oils may be modified by addition of molecular constituents to increase their density to match that of the salt solution.

The first electrode 14 is a cylinder of inner radius typically between 1 mm and 20 mm. A second, annular electrode 16 is arranged at one end of the fluid chamber 10, in this case, adjacent the back element 22. The second electrode 16 is arranged with at least one part in the fluid chamber 10 such that the electrode 16 acts on the first fluid A. The electrodes 14, 16 are connected to a power supply 24 in order to supply a voltage to the electrodes, hence an electrical field in the fluid chamber 10.

The two fluids A and B are non-miscible so as to tend to separate into two fluid bodies separated by a meniscus 12. When a voltage is applied at the power supply port 24, the wettability of the fluid contact layer 18 by the first fluid A varies, so that the contact angle of the meniscus 12 changes at the line of contact between the fluid contact layer 18 and the two liquids A and B. Between the first electrode 14 and the fluid contact layer 18 an insulating layer 26 is provided. Thus, the shape of the meniscus 12 is variable in dependence on the applied voltage. In fact, the meniscus 12 can be convex or concave; further, in dependence on the configuration of the fluid chamber and the arrangement of the electrodes a plurality of different shapes of the meniscus 12 can be realized.

Generally, depending on the choice of the oil used, the refractive index of the oil may vary between 1.25 and 1.60. Likewise, depending on the amount of salt added, the salt solution may vary in refractive index between 1.33 and 1.48. The fluids in this embodiment are selected such that the first fluid A has a lower refractive index than the second fluid B.

According to the present invention, the refractive indices $n_1$ and $n_2$ of the first and the second fluid, respectively, as well as the Abbe numbers $V_1$ and $V_2$ of the first and the second fluid, respectively, have to comply with the relation $$0.75 < \frac{V_1(n_2 - 1)}{V_2(n_1 - 1)} < 1.25 \qquad (I)$$

in order to provide an achromatic lens with adequate performance. In order to improve the performance in terms of the achromatization of the lens, the parameters $n_1$, $n_2$, $V_1$ and $V_2$ are chosen so that the equation $$\frac{V_1}{V_2} = \frac{n_1 - 1}{n_2 - 1} \qquad (2)$$

is fulfilled in good approximation.

An example for an electrowetting lens with achromatic properties follows. The exemplified electrowetting lens contains a salt solution with a refractive index $n_1=1.37$ and an Abbe number of $V_1=49$. The second fluid is polydimethylsiloxane with a refractive index $n_2=1.4$ and an Abbe number of $V_2=53$.

In another example, a salt solution of 0.1 M KCl in water is used. This solution has a $n_1=1.334$ and a $V_1=57.6$. The second fluid is n-hexane, with $n_2=1.375$ and $V_2=57.6$. This results therein that $(V_1/V_2)*(n_2-1)/(n_1-1)=1.12$, hence an adequate achromatization.

In a further example, the same salt solution is used. The second fluid is n-decane, with $n_2=1.412$ and $V_2=57.2$. This results therein that $(V_1/V_2)*(n_2-1)/(n_1-1)=1.24$, hence a sufficient achromatization. When using the more concentrated salt solution with $n_1=1.37$ and $V_1=49$, then the ratio is 0.954, which is clearly better.

In a reference example, not according to the invention, the same salt solution is used. The second fluid is herein decamethyltetrasiloxane, with $n_2=1.389$ and $V_2=49.9$. This results therein that $(V_1/V_2)*(n_2-1)/(n_1-1)=1.31$, and hence an insufficient achromatization. However, by changing the salt solution and using the more concentrated salt solution with $n_1=1.37$ and $V_1=49$, a very good achromatisation is achieved, as expressed in a number for $(V_1/V_2)*(n_2-1)/(n_1-1)$ of 1.032. This has moreover the advantage, in comparison to the alkanes, that the density difference between the salt solution and the second fluid is limited. This decamethyltetrasiloxane has a density of 0.85 and the salt solution has a density of about 1.03 kg/m$^3$.

In the following, examples for the behaviour of electrowetting lenses are provided that do either fulfill or not fulfill the requirements according to the present invention.

Figure 2A:
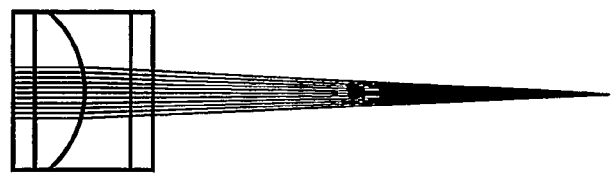
FIG. 2 shows a variable focus lens in two extreme switching configurations in schematic cross section.
Figure 2B:
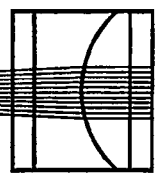

FIG. 2 shows a variable focus lens in two extreme switching configurations in schematic cross section. A first switching configuration is shown in part (a) and a second switching configuration is shown in part (b). In configuration (b) the electrowetting lens has negative optical power. Hence a parallel optical beam (object at infinity) forms a virtual image positioned at the left side of the drawing in FIG. 2(b). A comparison of the schematic drawings in FIG. 2 with FIG. 1 and the corresponding description clarifies the meaning of FIG. 2.

Figure 3A:
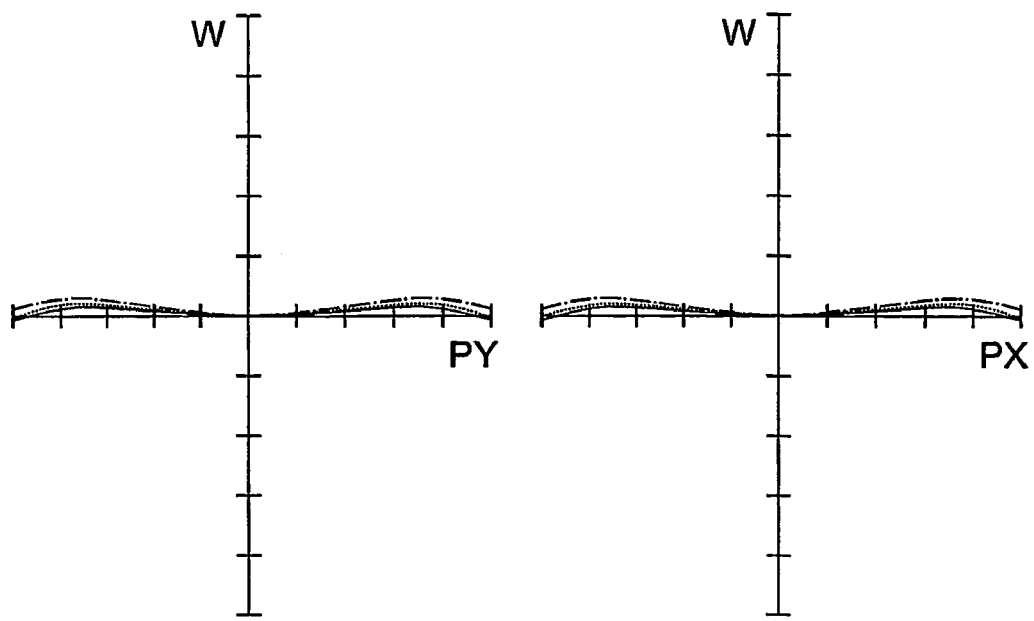
FIG. 3 shows wavefront plots of a variable focus lens according to the present invention for different wavelengths.
Figure 3B:
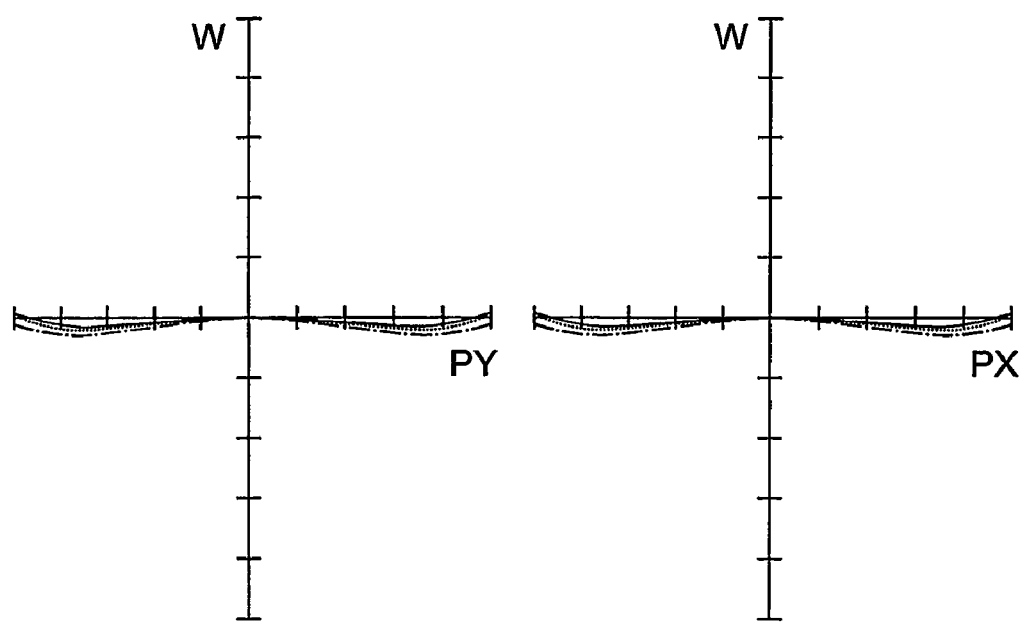

FIG. 3 shows wavefront plots of a variable focus lens according to the present invention for different wavelengths. Wavefront abberations W versus the normalized entrance pupil coordinate py and px are plotted for three different wavelengths. The dash-dotted line corresponds to a wavelength of 486 nm, the dotted line corresponds to a wavelength of 588 nm and the solid line corresponds to a wavelength of 656 nm. The scale on the vertical axis is given in portions of the individual wavelengths considered, while the maximum scale of each of the diagrams is 0.3 wavelengths.

In part (a) of FIG. 3, the wavefront abberations for the different wavelengths are plotted for the first switching configuration (a) from FIG. 2. In part (b) of FIG. 3, the wavefront abberations for the different wavelengths are plotted for the second switching configuration (b) of FIG. 2. As can be recognized, only very small wavefront abberations for the different wavelengths are present, and further, the abberations for the different wavelengths have the same tendency. This result (that will be better understood with reference to the discussion of FIG. 4 below) shows that a high performance lens with respect to the achromatization is provided. This is achieved by choosing the parameters $n_1$, $n_2$, $V_1$ and $V_2$ according to the present invention, namely $n_1=1.37$, $n_2=1.4$, $V_1=49$, and $V_2=53$.

Figure 4A:
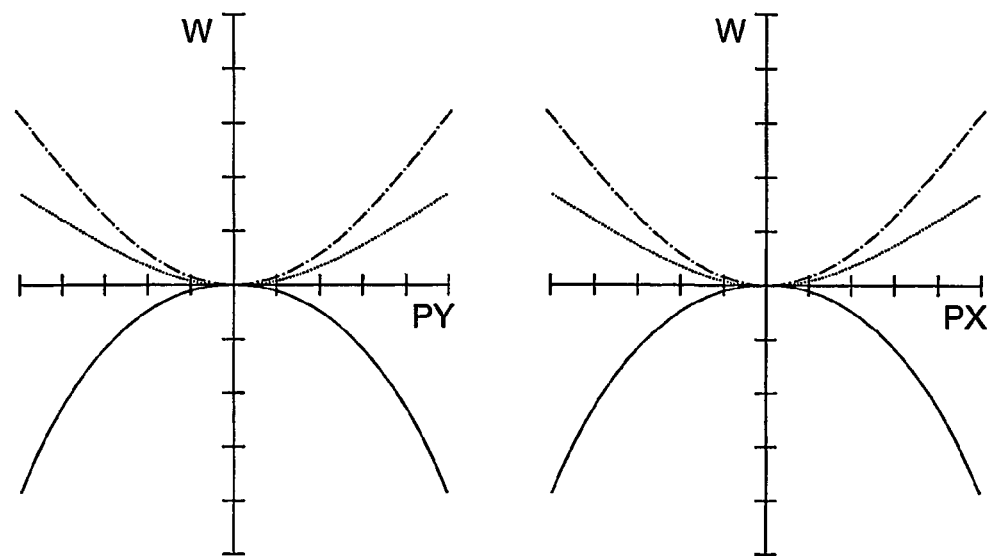
FIG. 4 shows wavefront plots for a variable focus lens that does not fulfill the conditions according to the present invention.
Figure 4B:
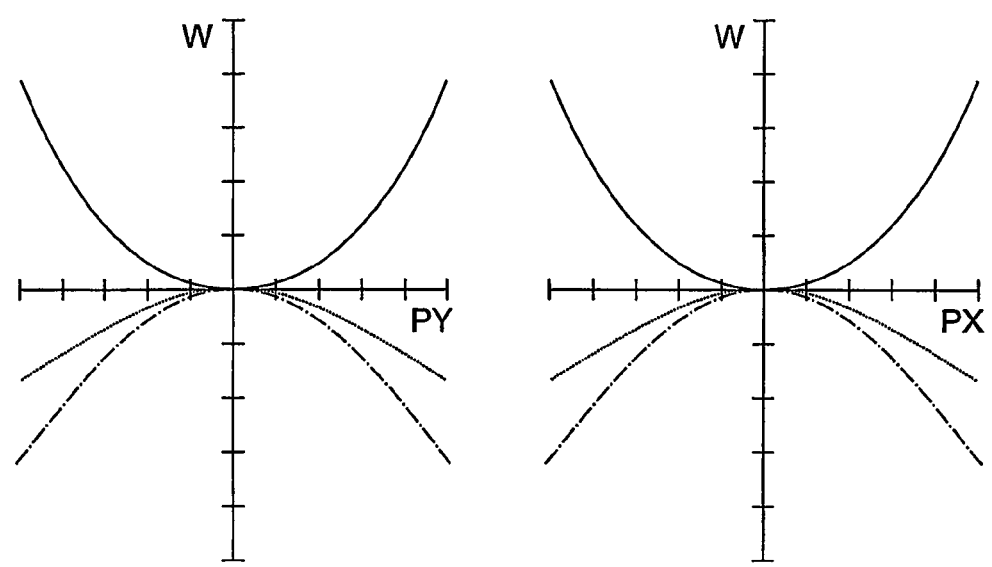

FIG. 4 shows wavefront plots for a variable focus lens that does not fulfill the conditions according to the present invention. This figure is to be understood in the same way as FIG. 3. Particularly, the scaling of the axes of the different diagrams is equal to that of FIG. 3. As can be recognized, the wavefront abberations for the different wavelengths are much greater than those of FIG. 3; further, the abberations for the different wavelengths are strongly diverging as the entrance pupil coordinate becomes larger. Furthermore, from this figure we can deduce that the chromatic aberration changes sign (in FIG. 4(a) the dash-dotted line is the upper line, while in FIG. 4(b) it is the lower line) when the electrowetting lens is switched between the two configurations having different sign in optical power. Due to this feature the conventional techniques of making a lens achromatic can not be applied here, since these give a constant correction independent of the optical power of the lens. In that sense, FIG. 4 shows the behaviour of a non-achromatic electrowetting lens. This results from the choice of the parameters $n_1$, $n_2$, $V_1$ and $V_2$. $n_1$, $n_2$ and $V_1$ are chosen as in the example corresponding to FIG. 3, while $V_2$ is chosen to be 35. FIG. 4 therefore shows a behaviour of an electrowetting lens that is not in accordance with the present invention.

It is noted that the electrowetting lens according to the present invention can be different from the example shown in the drawing and described above. Although it is preferable that the electrowetting lens is cylindrical, deviations from a cylindrical shape are possible. Further, it is within the scope of the present invention that the electric field is not only applied by a first and a second electrode but by a plurality of electrodes in order to design the electric field and finally the meniscus to a particular shape. Generally, it is to be noted that the term "comprising" in the present disclosure does not exclude further elements and that also the mentioning of a particular element does not exclude that a plurality of elements related to the mentioned element are present. The above embodiments are to be understood as illustrative examples of the invention. Further embodiments of the invention are envisaged. For example, the second fluid may consist of a vapor rather than an insulating liquid.

Furthermore, equivalents and modifications not described above may also be employed without departing from the scope of the invention, which is defined in the accompanying claims.

The invention claimed is:

1. A variable focus lens comprising a fluid chamber (10) containing a first fluid (A) and a second fluid (B), the fluids being non-miscible and in contact over a meniscus (12), means (14,16) for applying an electric field over the fluid chamber such that the shape of the meniscus varies in dependence on the electric field, the first fluid having an index of refraction $n_1$ and an Abbe number $V_1$, and the second fluid having an index of refraction $n_2$ and an Abbe number $V_2$, $n_1$ being different from $n_2$, wherein the parameters $n_1$, $n_2$, $V_1$ and $V_2$ comply with the following relation:

$$0.75 < \frac{V_1(n_2-1)}{V_2(n_1-1)} < 1.25. \quad (I)$$

2. The variable focus lens according to claim 1, wherein the parameters $n_1$, $n_2$, $V_1$ and $V_2$ comply with the following relation:

$$0.9 < \frac{V_1(n_2-1)}{V_2(n_1-1)} < 1.1. \quad (II)$$

3. The variable focus lens according to claim 1, wherein the fluid chamber comprises a substantially cylindrical wall, a fluid contact layer (18) is arranged on the inside of the cylindrical wall, the means for applying an electrical field comprising a first electrode (14) separated from the first fluid and the second fluid by the fluid contact layer (18), and a second electrode (16) acting on the first fluid, and the fluid contact layer having a wettability by the first fluid which varies under the application of a voltage between the first electrode and the second electrode, such that the shape of the meniscus varies in dependence on the voltage.

4. The variable focus lens according to claim 1, wherein the first fluid has an index of refraction of $n_1=1.37$ and an Abbe number of $V_1=49$, and the second fluid has an index of refraction of $n_2=1.4$ and an Abbe number of $V_2=53$.

5. The variable focus lens according to claim 1, wherein the first fluid comprises salted water, and the second fluid comprises polydimethylsiloxane.

6. An optical device comprising a lens according to claim 1.

7. An image capture device comprising a lens according to claim 1.

* * * * *